(12) United States Patent
Parthasarathy et al.

(10) Patent No.: US 7,133,889 B2
(45) Date of Patent: Nov. 7, 2006

(54) FLEXIBLE GALOIS FIELD MULTIPLIER

(75) Inventors: Sivaghanam Parthasarathy, Carlsbad, CA (US); Cinzla A. Bartolommei, La Jolla, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 711 days.

(21) Appl. No.: 10/032,742

(22) Filed: Oct. 22, 2001

(65) Prior Publication Data

US 2003/0135530 A1 Jul. 17, 2003

Related U.S. Application Data

(60) Provisional application No. 60/323,689, filed on Sep. 20, 2001.

(51) Int. Cl.
*G06F 7/72* (2006.01)

(52) U.S. Cl. .................................... 708/492
(58) Field of Classification Search ......... 708/491–492
See application file for complete search history.

(56) References Cited

U.S. PATENT DOCUMENTS

| | | | | |
|---|---|---|---|---|
| 6,049,815 A * | 4/2000 | Lambert et al. | ............ | 708/492 |
| 6,389,442 B1 * | 5/2002 | Yin et al. | .................. | 708/492 |
| 2001/0056452 A1 * | 12/2001 | Kaliski et al. | .............. | 708/492 |

OTHER PUBLICATIONS

Reed Solomon Decoder: TMS320C64x Implementation; Application Report, SPRA686, Dec. 2000.
Hasan, M.A. "An Architecture for a Universal Reed-Solomon Encoder using a Triangular Basis Multiplication Algorithm", IEEE CCECE/CCGEI, 1993, pp. 255-258.

Hasan, M.A. et al. "Efficient Architectures for Computations Over Variable Dimensional Galois Fields", IEEE Transactions on Circuits and Systems-I: Fundamental Theory and Applications, vol. 45, No. 11, Nov. 1998, pp. 1205-1211.
Wicker, S.B. et al. "Reed-Solomon Codes and Their Applications", IEEE Press, pp. 68-70.
Furness, R. et al. "Multiplication Using the Triangular Basis Representation Over GF($2^m$)", 1996 IEEE, pp. 788-792.
Furness, R. et al. "Generalised Triangular Basis Multipliers for the Design of Reed-Solomon Codecs", 1997 IEEE, pp. 202-211.
Paar, C. "Efficient VLSI Architectures for Bit Parallel Computation in Galois Fields", PhD Thesis, University of Essen, Jun. 1994, Chapter 5, pp. 42-58.
Paar, C. et al. "Efficient Multiplier Architectures for Galois Fields GF($2^{4n}$)", IEEE Transactions on Computers, vol. 47, No. 2, Feb. 1998, pp. 162-170.
Furness, R. et al. "GF(2m) Multiplication over the Triangular Basis for Design of Reed-Solomon Codes", IEEE Proc.-Comput. Digit. Tech., vol. 145, No. 6, Nov. 1998, pp. 437-443.

* cited by examiner

*Primary Examiner*—D. H. Malzahn
(74) *Attorney, Agent, or Firm*—Stephen C. Bongini; Lisa K. Jorgenson

(57) ABSTRACT

A flexible Galois Field multiplier is provided which implements multiplication of two elements within a finite field defined by a degree and generator polynomial. One preferred embodiment provides a method for multiplying two elements of a finite field. According to the method, two input operands are mapped into a composite finite field, an initial KOA processing is performed upon the two operands in order to prepare the two operands for a multiplication in the ground field, the multiplication in the ground field is performed through the use of a triangular basis multiplier, and final KOA3 processing and optional modulo reduction processing is performed to produce the result. This design allows rapid redefinition of the degree and generator polynomial used for the ground field and the extension field.

18 Claims, 5 Drawing Sheets

FLEXIBLE GALOIS FIELD MULTIPLIER

CROSS-REFERENCE TO RELATED APPLICATIONS

This application is based upon and claims priority from prior U.S. Provisional Application No. 60/323,689, filed Sep. 20, 2001, the entire disclosure of which is herein incorporated by reference.

BACKGROUND OF THE INVENTION

1. Field of the Invention

This invention generally relates to the field of algebraic data processors, and more particularly relates to reconfigurable numeric processors that perform multiplication of polynomials over finite fields.

2. Description of Related Art

Galois fields are finite sets of elements on which mathematical operations are specifically defined. The Galois field $GF(2^n)$ is a field having N elements, with $N=2^n$. One representation of this field is the polynomial representation. All of the elements are written in the form of an n−1 degree polynomial:

$$a_{n-1}X^{n-1}+a_{n-2}X^{n-2}+\ldots+a_2X^2+a_1X+a_0$$

with $a_i$ being a coefficient belonging to $GF(2)$ and therefore being equal to either "0" or "1". Consequently, each element can then be likened to a number encoded on n bits. A Galois field of degree n (i.e., $GF(2^n)$), is defined by an irreducible polynomial of degree n. The irreducible polynomial defining a specific Galois Field is referred to as a Generator (or Primitive) Polynomial.

The computations performed on elements in a Galois Field correspond to computations made on polynomials reduced by an irreducible $n^{th}$ degree polynomial. The computations done on the elements of the field therefore operate differently than conventional operations. In particular, addition of two elements within a finite field in the form of $GF(2^n)$ is done bit-by-bit using an XOR circuit and subtraction is done identically to addition. Multiplication is defined differently, and may be performed in two steps. In a first step, a multiplication similar to a conventional multiplication is performed, and then in a second step, a reduction is performed on the result of the multiplication using a generator polynomial.

Multiplication of elements contained in larger Galois Fields (e.g., $GF(2^{64})$), is very computationally expensive. Composite fields are sometimes used to reduce the processing complexity in performing multiplication on elements of such larger Galois Fields. A composite field may be represented as $GF((2^n)^m)$ and for practical reasons is usually limited to cases where $m=2^t$, where t is an integer. In the example of $GF((2^n)^m)$, the field $GF(2^n)$ is referred to as the ground field. Realization of processing of composite fields includes the use of the "Karatsuba-Ofman Algorithm" (KOA). The KOA is a recursive method for efficient polynomial multiplication and may be used for composite fields of the form $GF((2^n)^m)$, where $m=2^t$, where t is an integer. The KOA is described in "Multiplication of Multidigit Numbers on Automata," Soviet Physics-Doklady (English translation), Vol. 7, No. 7, pp. 595–596 (1963), which is herein incorporated by reference.

Galois fields have several areas of application, including generation of error correction codes or encryption codes for digital data transmission. Among the encryption codes, there is the encryption known as "elliptic curve encryption." This type of encryption uses binary numbers encoded on a large number of bits (typically, 100 to 200 bits). The effectiveness and efficiency of systems using Galois fields, including encryption and error correction, may be adjusted by the use of different degree Galois fields. Many applications that perform multiplication of Galois fields would benefit if the system design allows changing of the size of the Galois Field, (i.e., the degree of the field) and/or the generator polynomial.

Conventional computation circuits used for performing operations on elements of Galois fields are typically conventional processors that may or may not be coupled to dedicated hardware processing circuits. The use of a conventional processor alone without dedicated hardware circuits requires significant memory resources and computational time to perform Galois Field multiplication. Current Galois Field multiplier designs that employ dedicated hardware are only practical for multiplying Galois Fields with small degree generator polynomials. These multiplier designs are also limited in their efficiency, relative to processing speed and/or circuit complexity, or have been limited in the processing time over which the field definition parameters may be changed. The use of dedicated hardware processing, either alone or in conjunction with a conventional processor, has therefore resulted in far less efficient implementations than fixed realizations that operate on predefined finite fields.

SUMMARY OF THE INVENTION

In view of these drawbacks, it is an object of the present invention to overcome the above-mentioned drawbacks and to provide an efficiently realized reconfigurable Galois Field element multiplier that allows changing of generator polynomials and/or Galois Field size.

One preferred embodiment of the present invention provides a method for multiplying two elements of a finite field. According to the method, two input operands are mapped into a composite finite field, an initial KOA processing is performed upon the two operands in order to prepare the two operands for a multiplication in the ground field, and the multiplication in the ground field is performed through the use of a triangular basis multiplier.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
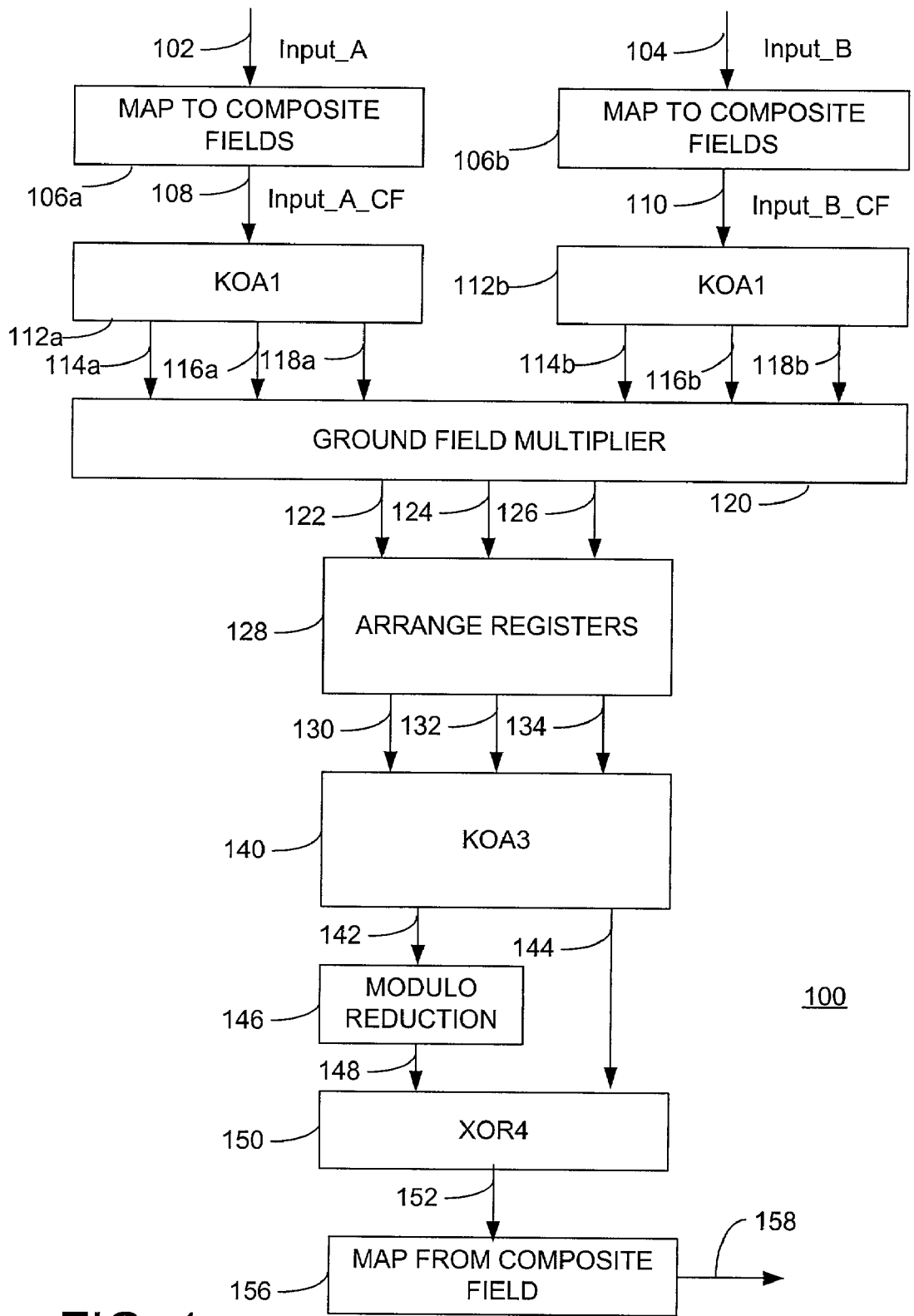
FIG. 1 is a block diagram illustrating a flexible Galois Field multiplier in accordance with a preferred embodiment of the present invention.

The present invention, according to one preferred embodiment, utilizes multiple-staged processing of two Galois Field elements to perform a finite field multiplication of those two elements. The stages of the processing performed by the preferred embodiment may be reconfigured to handle elements with a different number of bits, thereby allowing different Galois Field sizes to be efficiently processed. The preferred embodiment of the present invention utilizes composite finite fields to provide a processing structure that allows efficient implementation of the multiplication processing. The input operands are mapped into the composite field that is used for multiplication and the result of the multiplication processing is then mapped back into the original finite field.

The use of a composite field multiplier in the exemplary embodiment advantageously allows for a considerable reduction in the memory required by the processing hardware. Multiplication of Galois fields of degree $GF(2^k)$ is commonly performed through the use of lookup tables. The use of lookup tables requires an amount of memory equal to $2^k \times k$ bits for each table. Two lookup tables are required in order to perform a complete multiplication. One table maps the input operands represented as polynomials to a power representation and the other table maps the result of the multiplication (in exponential representation) back to a polynomial form. A reconfigurable multiplier is required to store these two tables for each field size and for each generator polynomial to be supported. In contrast to lookup table based systems, the composite field multiplier of preferred embodiments of the present invention requires an amount of memory equal to $2 \times (k \times k)$ bits, which is the storage required for the two matrices necessary for the mapping to and reverse mapping from the composite field. These matrices are needed for each composite field and for each different generator polynomial that is supported. Aside from the memory required to support the conversion of the operands to and from the composite fields, the ground field multiplier of the preferred embodiment does not require any memory.

The preferred embodiment utilizes the KOA algorithm to reduce the multiplicative complexity of the processing to perform the multiplication of the two operands. The preferred embodiment divides the multiplication processing into three parts. An initial stage performs partial processing according to the KOA algorithm. The initial stage, referred to herein as KOA1, accepts as input two operands of length m and produces an output of two vectors which each contain $(3/2)^{\log_2(m)} m = 3^{\log_2(m)}$ elements. Each element in the output vectors belongs to the ground field, and hence it has n bits. Software implementations of the KOA algorithm require $\log_2 m$ processing iterations to obtain the final output vectors. The KOA1 processing module of the exemplary embodiment described in detail below implements the initial KOA processing in hardware to accelerate processing.

The results produced by the initial KOA1 processing depend upon the degree m of the composite field. If m is equal to two, the initial KOA1 processing will produce a result with three elements. If m is equal to four, the KOA1 processing produces a result with nine elements. If m is equal to eight, the KOA1 processing produces a result with twenty-seven elements.

The output produced by the initial processing stage is provided to a second stage, which performs partial multiplication processing by performing an element-wise multiplication between the ground field elements of the vectors that were produced by the KOA1 processing module. The second stage of the preferred embodiment uses a triangular basis multiplier to implement ground field multiplication of the composite field data. The triangular basis multiplier of the second stage is designed to efficiently multiply finite field elements of any degree up to a maximum (e.g., $GF(2^8)$). The triangular basis multiplier incorporated in the preferred embodiment performs bit parallel processing to increase speed and allows rapid changing of the generator polynomial and/or field size (n) used for the ground field multiplication. The output of the second stage, the ground field multiplier, is then processed by a third stage that implements the remainder of the KOA processing that is required to multiply the two original operands. This third stage, referred to herein as KOA3, finalizes the conventional multiplication product of the two operands. After the KOA processing is finalized by the KOA3 module, the multiplication product is processed by a modulo reduction module to transform the KOA product output into elements of the proper finite field.

The exemplary embodiment of the present invention described in detail below illustratively accepts two operands which represent Galois Field elements that are within Galois Fields of $GF(2^i)$, up to $GF(2^{64})$. These operands are accepted in a single thirty-two bit register if the operands are up to thirty-two bits long, and in two registers each if the operands are between thirty-two and sixty-four bits in length.

While the exemplary embodiment described below implements a scalar pipeline to perform the described processing, in other embodiments this processing is performed by one or more processors utilizing a super-scalar architecture in order to achieve even greater performance. Modifications of the described embodiments of the present invention for a particular application (such as the translation of the scalar architecture to a super-scalar architecture) could easily be made by one of ordinary skill in the art.

1. Software Processing

The exemplary embodiment of the present invention performs the described processing through the execution of software routines which either process data themselves or provide data to dedicated hardware which performs the associated processing and returns the result to the software. A more thorough description of the software processing is therefore provided below. However, in further embodiments, the processing is performed completely in software, completely in dedicated hardware or in any combination of the two.

The illustrated software routines described below use thirty-two bit registers to provide data to and receive results from the functions called by the software. The instructions utilized by the illustrated software conform to the following format:

{Inst_name, res, opA, opB, Imm} where Inst_name is a unique instruction name, res is a thirty-two bit register that receives the results of the processing performed by the instruction, opA and opB are two, thirty-two bit registers that provide input into the function and Imm is an immediate operand that controls the operation of the instruction.

The operation specific software instructions are described in conjunction with the description of the specialized processing blocks provided below. The software processing of the preferred embodiment also utilizes general purpose software instructions. The general purpose software instructions include the MVI instruction, which loads the immediate value specified in the fifth operand into the register specified in the second operand. Another general purpose instruction is the HALT instruction, which halts processing and accepts no arguments.

2. Operation of Galois Field Multiplier

A Flexible Galois Field multiplier 100 according to a preferred embodiment of the present invention is shown in FIG. 1. Each input operand Input_A 102 and Input_B 104 is received in one or two registers that are each thirty-two bits in length, depending upon the size of the operand.

Multiplier Configuration

The Flexible Galois Field multiplier 100 is first initialized with configuration of the degree of the Galois field that is used as the ground field and configuration of the generator polynomial of the ground field. The hardware which implements ground field multiplication is configured with these parameters as is described below. The software instructions which perform the ground field hardware initialization are the LDPOLY and LDn instructions.

The instructions LDPOLY and LDn are used in the exemplary embodiment, as shown in the exemplary software listing below, if the ground field multiplier is not used in combination with the composite field structure. The instruction LDPOLY loads the generator polynomial of the ground field into the second parameter. The instruction LDn loads the degree n of the ground field into the second parameter.

Data Input Processing

The input data, which comprises the two finite field data elements to be multiplied, are loaded for processing in the exemplary embodiment through the use of the LDop software instruction. The LDop instruction accepts a register containing the input data as its third parameter and loads the value into the register specified in the second parameter.

The processing of these two operands in the exemplary embodiment then proceeds as described below.

Map to Composite Field

Preferred embodiments of the present invention initially perform mapping to composite field processing 106a and 106b for each input operand Input_A and Input_B. The mapping to composite field processor's output values 108 and 110 are then each processed by KOA1 processing blocks 112a and 112b. The processing of one input operand Input_A will be described below. The same processing is performed for the other input operand Input_B.

The map to composite field processing block 106a transforms the input operand into composite fields by performing a matrix-vector multiplication between the input operand and a transformation matrix. The transformation matrix is a function of the generator polynomials of the field $GF(2^i)$, where $i=mn$, and of the two generator polynomials of the field $GF((2^n)^m)$. This transformation changes the data from the $GF(2^i)$ to $GF(2^n)^m)$ representation. The calculation of the transformation matrix is performed in a conventional manner.

The exemplary embodiment utilizes one of two software commands to map the input data into the composite field. The functions which are used to map data elements between base and composite fields, as is described above, are CNVK2NM and CNVK2NM_8. These functions accept one register of data in their third operand and produce the output in the second operand. The CNVK2NM_8 function is used when m equals eight and is used twice for the two registers of input data.

KOA1 Processing

The KOA1 processing block performs the initial step of the KOA processing for the composite field inputs Input_A_CF and Input_B_CF. The processing of the KOA1 processing block 112a accepts these composite field inputs and prepares them for processing by the ground field multiplier, which is the next processing stage. The KOA1 processing block 112a transforms the input of length m into a vector which has $3^{log_2(m)}$ elements.

The KOA1 block 112a of the exemplary embodiment accepts the thirty-two bit output Input_A_CF of the map to composite field block 106a as an operand and segments that thirty-two bit operand register into four "slices" of eight bits each. Each "slice" is a coefficient that belongs to the ground field. If the degree n of the ground field is less than eight, the slice will occupy eight bits with the most significant bits will be set to zero. For example, if n is equal to eight, the data in each slice may be represented as XXXXXXXX. If n is equal to five, the data in each slice may be represented as 000XXXXX, wherein the bits marked as X may be either 0 or 1.

Operation of the KOA1 processing block for other field sizes either sets the unused data bits in the register to zero (e.g., for $GF(2^{16})$) or further processing is performed as described below. The thirty-two bit operand received by the KOA1 algorithm is segmented into four slices $a_0, a_1, a_2, a_3$, which each have eight bits. The division of the thirty-two bit data registers into four, eight bit slices is preserved throughout the processing of the data until conversion of the data from the composite field for output from the flexible Galois field multiplier 100. The processing of the KOA1 block 112a produces three, thirty-two bit output quantities Low_A 114a, Middle_A 116a and High_A 118a. The structure of the output fields is shown below, with each $a_n$ being an eight bit slice. The Low_A 114a and Middle_A 116a comprise thirty-two bits which each have four, eight bit slices as defined below, and High_A 118a contains data in the lowest order eight bit slice. The "+" sign in the illustration below indicates a bit-wise "exclusive-OR" logical operation to be performed on the corresponding eight bits of the slices. Each of the eight bit slices contains a data element with an degree of up to $GF(2^8)$ which is a provided to the ground field multiplier 120. Each thirty-two bit register will contain four slices which are simultaneously provided to the ground multiplier for processing.

$$\text{operand} = \begin{pmatrix} a_0 \\ a_1 \\ a_2 \\ a_3 \end{pmatrix}$$

$$KOA1(\text{operand}) = \begin{Bmatrix} a_0 \\ a_0 + a_1 \\ a_1 \\ a_0 + a_2 \\ ---- \\ a_0 + a_1 + a_2 + a_3 \\ a_1 + a_3 \\ a_2 \\ a_2 + a_3 \\ -------- \\ a_3 \\ x \\ x \\ x \end{Bmatrix} \begin{matrix} \\ \\ \text{Low\_A(114}a\text{)} \\ \\ \\ \\ \text{Middle\_A(116}a\text{)} \\ \\ \\ \\ \text{High\_A(118}a\text{)} \\ \\ \\ \end{matrix}$$

The result Low_A 114a is derived in the exemplary embodiment by copying the least significant slice of the operand Input_A_CF 108 into the least significant position of the result (i.e., into slice 0). To obtain slice 1 of the result of Low_A 114a, the least significant slice is added to the adjacent slice (a0+a1) of the operand Input_A_CF 108. Slice 2 of the result is obtained by copying slice 1 of the operand Input_A_CF (i.e., slice a1). Slice 3 is obtained by summing slices 0 and 2 of the operand Input_A_CF 114a (i.e., a0+a2).

The result Middle_A 116a is obtained as follows. Slice 0 of the result Middle_A 116a is the sum of the four slices of the operand Input_A_CF 108 (i.e., a0+a1+a2+a3). In the exemplary embodiment, this sum is calculated by a chain of logical exclusive-OR blocks which each perform a bit-wise exclusive-OR on each of the corresponding eight bits of the input operands. This chain first uses an exclusive-OR block to calculate a2+a3, then another exclusive-OR block is used to calculate a0+a1, and finally the two results are set as input of a third exclusive-OR block. This exemplary embodiment uses the results of a0+a1 and a2+a3 already calculated to obtain other slices of the final result (for example, a0+a1 is slice 1 of the result Low_A). Slice 1 of Middle_A 116a is obtained by summing slice 1 and 3 of the operand Input_A_CF 108 (i.e., a1+a3). Slice 2 is obtained by copying slice 2 of the operand Input_A_CF 108 (i.e., a2). Slice 3 is obtained by adding slice 2 and 3 of the operand Input_A_CF 108 (i.e., a2+a3) with an exclusive-OR block. The result High_A 118a is obtained by copying slice 3 of the operand Input_A_CF 108 (i.e., a3) and setting all the other slices to 0.

The KOA processing is implemented in specialized hardware in preferred embodiments. The data are provided to the specialized hardware by software processing through interface instructions. A separate interface instruction is provided to return each output register described above. The KOA1 software routines are KOA1L, KOA1M and KOA1H, which return the values Low_A, Middle_A and High_A, respectively. These instructions accept an input operand such as Input_A_CF 108 or Input_B_CF 110 as their third operand and return the low, middle or high register output of the KOA1 processing, as described above, in the second operand of the instruction.

The KOA1 processing further prepares the data for subsequent processing in the second stage of processing by the ground field multiplier. In the case in which m equals two, the result of the KOA1 processing contains twenty-four bits. This requires that the thirty-two bit output of the KOA1 processing block be masked so as to ensure the most significant slice is zero. The instruction MSK sets the most significant slice (i.e., slice three) to zero.

Second Stage Processing: Ground Field Multiplication

After the KOA1 processing is performed for each of the two operands, the results of that first stage are accepted and processed by the second multiplication stage of the exemplary embodiment, a ground field multiplier. The ground field multiplier of preferred embodiments of the present invention utilizes a triangular multiplier which is adapted to be able to rapidly accommodate changes in the generator polynomial and the size (or degree) of the ground field used for multiplication. Other embodiments may utilize a processor based upon other multiplication techniques to perform the second stage of multiplication processing. The second stage produces a set of ground field multiplicands for processing by the third multiplication stage.

The ground multiplier of preferred embodiments may be configured to process data elements which are up to eight bits in length (i.e., the ground field may be selected to be any $GF(2^n)$ up to $GF(2^8)$). The field size processed by the ground multiplier is configured to correspond to the size of the ground field produced by the composite field mapping. The ground field multiplier of the exemplary embodiment utilizes four parallel processing channels to allow simultaneous multiplication of four pairs of ground field data elements. The processing performed by a single channel of the ground field multiplier will be described for simplicity with the understanding that there are three further parallel channels in the exemplary embodiment that perform similar processing.

Ground Field Multiplier

Figure 2:
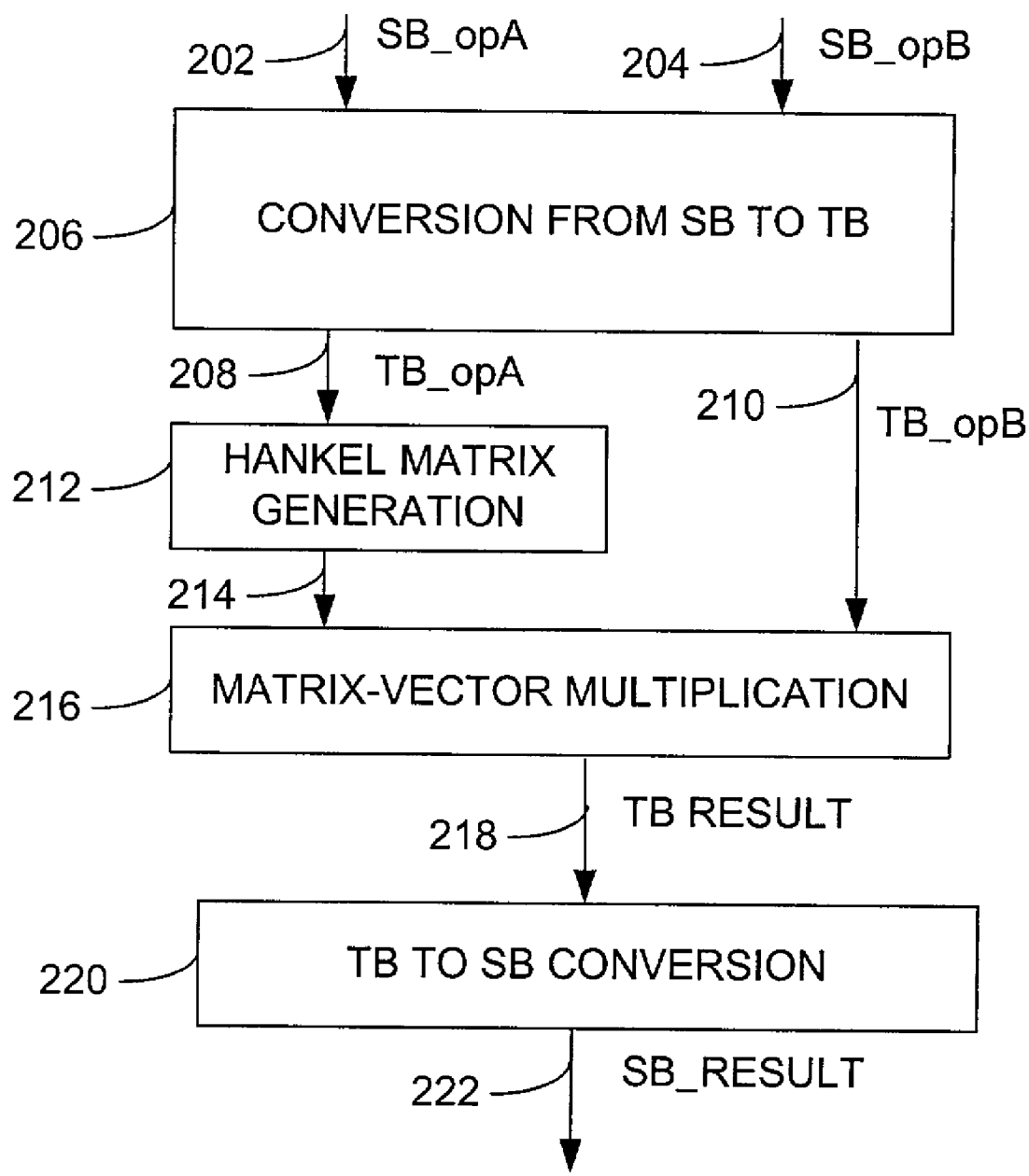
FIG. 2 is a block diagram showing in detail the ground field multiplication block of the multiplier of FIG. 1 according to one embodiment of the present invention.

The block diagram of an exemplary ground field multiplier channel 200 is illustrated in FIG. 2. The processing performed for a general eight bit data element will be described. Multiplication of smaller data elements is performed by the described hardware in a straightforward manner, as is described below. The ground field multiplier channel 200 accepts two operands which represent ground field data elements SB_Input_A and SB_Input_B. These input elements in the exemplary embodiment are contained within two sets of three, thirty-two bit output values that are produced from the first processing stage, the KOA1 processing block. Each eight bit "slice" of these input registers, referred to herein as Low_A 114a, Middle_A 116a, High_A 118a, Low_B 114b, Middle_B 116b and High_B 118b, contains an independent ground field data element to be processed by the ground field multiplier.

The initial processing of the ground field multiplier converts one of the two operands, either SB_Input_A or SB_Input_B, from the Standard Base (SB) in which it is received to the Triangular Base (TB) that is used in performing the multiplication according to triangular base multiplication theory. The transformation from an SB data element, which consists of n data bits $a_k$, into a TB data element, which consists of n data bits $\tilde{a}_k$, is performed in the exemplary embodiment according the following equation, wherein $f_k$ are the coefficients of the ground field generator polynomial:

$$\tilde{a}_i = a_{n-1-i} + (1 - \delta_{i,0}) \sum_{l=1}^{i} \tilde{a}_{i-l} f_{n-l} \pmod 2 \quad 0 \le i \le n-1$$

This function is recursive (i.e., the higher order bits in the TB data element are a function of the lower order bits).

Unrolling this equation to illustrate the processing performed for an exemplary eight bit data element (vector A) given as $(a_7,a_6,a_5,a_4,a_3,a_2,a_1,a_0)$, gives us the following eight bit data representation, where the "+" indicates a logical "Exclusive-OR" operation:

$$\tilde{a}_0 = a_7$$

$$\tilde{a}_1 = a_6 + \tilde{a}_0 f_7$$

$$\tilde{a}_2 = a_5 + \tilde{a}_1 f_7 + \tilde{a}_0 f_6$$

$$\tilde{a}_3 = a_4 + \tilde{a}_2 f_7 + \tilde{a}_1 f_6 + \tilde{a}_0 f_5$$

$$\tilde{a}_4 = a_3 + \tilde{a}_3 f_7 + \tilde{a}_2 f_6 + \tilde{a}_1 f_5 + \tilde{a}_0 f_4$$

$$\tilde{a}_5 = a_2 + \tilde{a}_4 f_7 + \tilde{a}_3 f_6 + \tilde{a}_2 f_5 + \tilde{a}_1 f_4 + \tilde{a}_0 f_3$$

$$\tilde{a}_6 = a_1 + \tilde{a}_5 f_7 + \tilde{a}_4 f_6 + \tilde{a}_3 f_5 + \tilde{a}_2 f_4 + \tilde{a}_0 f_3 + \tilde{a}_0 f_2$$

$$\tilde{a}_7 = a_0 + \tilde{a}_6 f_7 + \tilde{a}_5 f_6 + \tilde{a}_4 f_5 + \tilde{a}_3 f_4 + \tilde{a}_0 f_3 + \tilde{a}_0 f_2 + \tilde{a}_0 f_1$$

The structure of the above equations shows that the processing begins with the most significant bit (MSB) of the SB data ($a_7$ in this example). Preferred embodiments of the present invention implement this conversion in hardware, and the hardware is intended to operate on data with variable ground field sizes while requiring a minimum of reconfiguration. The exemplary embodiment of the present invention accommodates variable ground field sizes without alteration of the processing hardware by switching the order of the data bits in SB_Input_A 202 so that the rightmost bit is the MSB. This allows the SB to TB converter 206 to operate on variable sized data elements without re-implementing the hardware. In order to simplify the processing within the variable triangular multiplier, the data bits of the generator polynomial are also switched using the same circuitry.

Figure 3:
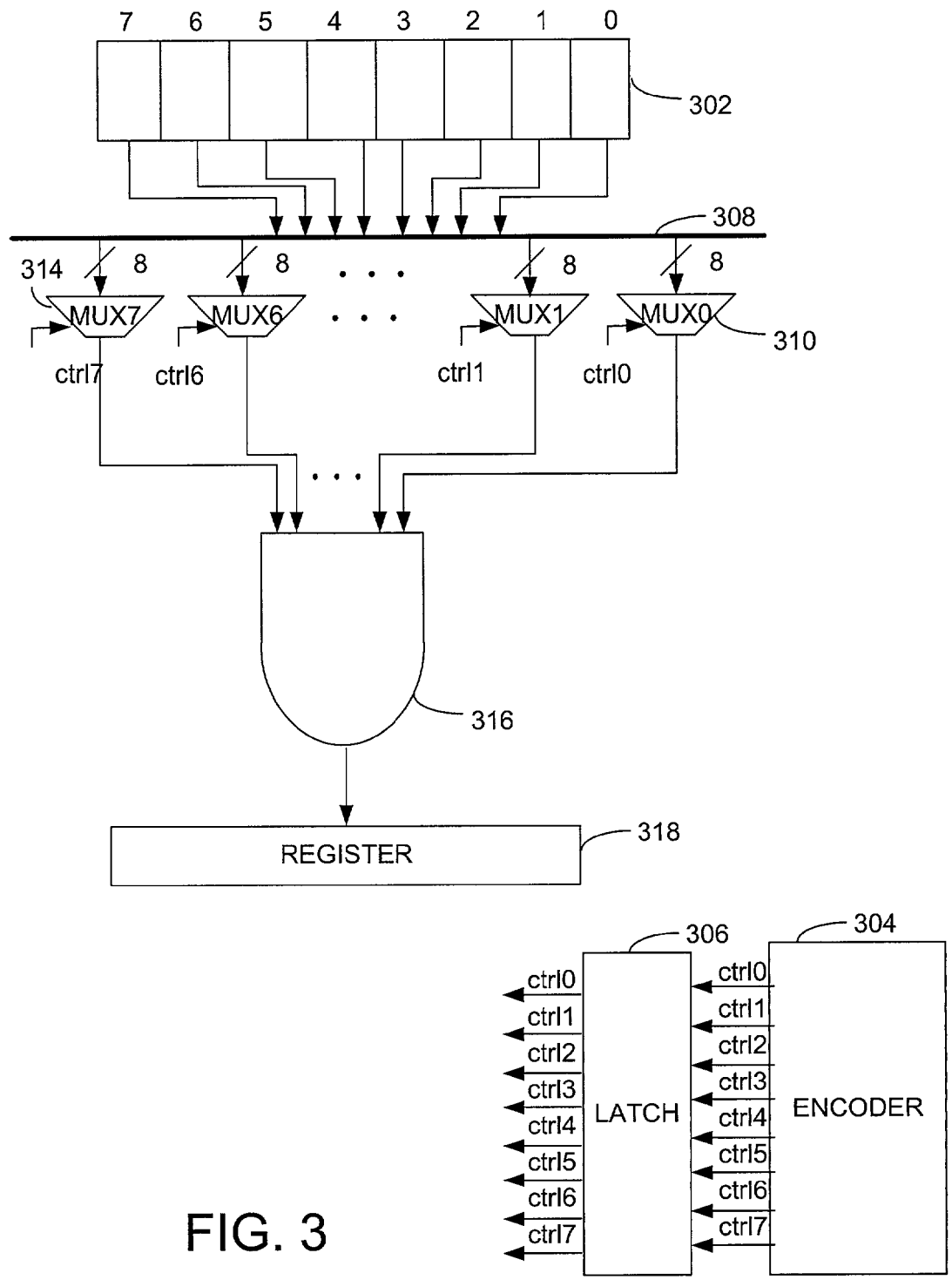
FIG. 3 is a block diagram showing in detail the bit switching component of the ground field multiplication block of FIG. 2 according to one embodiment of the present invention.

The bit switching in the exemplary embodiment is performed as the first step in the SB to TB converter and is performed by a PolyInit block. An exemplary PolyInit block 300 is shown in FIG. 3. The bit switching performed by the PolyInit block 300 is performed by a set of n 'n-to-1' multiplexers that are configured to each select the proper input bit within SB_Input_A that will correspond to the output bit associated with that n-to-1 multiplexer. In the exemplary embodiment, the hardware is constructed with n equal to eight. Further embodiments may use any value for n.

The processing of the PolyInit block 300 begins with the latching of the input data element into input register 302. The exemplary embodiment operates on data stored in the input register, thereby reducing memory requirements of the processing hardware. The eight bits contained within input register 302 are delivered to an input data bit bus 308, which provides all eight bits to the eight inputs of each of the eight multiplexers. The multiplexers are controlled in the preferred embodiment by eight control signals ctrl0 through ctrl7. Each of these control signals is generated by an encoder 304 and contains three bits, to allow selection of one of the eight input bits for each output bit. The encoder generates the proper control signals in response to a signal that indicates the number of bits which are to be processed (i.e., the degree of the Galois Field over which the triangular multiplication is to be performed).

The control signals are held in register 306 and constantly provided to the multiplexers. The control signals are only changed when the size of the ground field changes (i.e., the "n" of $GF(2^n)^m$)). In other words, the encoding of the control signals ctrl0 to ctrl7 in response to the input n is not performed for each multiplication operation, but only when the size of the ground field is changed.

Once the multiplexers are configured, the eight bits of data that are produced by the eight multiplexer outputs are masked according to the degree of the ground field (i.e., the number of output bits to be produced). This masking is performed by an AND gate bank 316, which receives a mask data field of nine bits in length. The nine bit mask is included to allow proper masking of the generator polynomial, which is also processed by the same PolyInit block 300 in the exemplary embodiment (as described below). The output of the AND gate bank 316 is latched into an output register 318, with the Most Significant Bit (MSB) in the rightmost position regardless of the degree of the ground field.

The PolyInit block 300 is used to switch the bits of both one input operand SB_Input_A and the bits of the generator polynomial. A second set of registers is used in order to process the generator polynomial (i.e., a second input register 302 and output register 318 are used to store the "normal" generator polynomial and the "switched" polynomial, respectively). The order of the generator polynomial is one greater than the order of the data. Therefore, the mask data fed into AND gate bank 316 is at most 9 bits in size. If the multiplier is processing $GF(2^8)$, the MSB (the ninth bit) is set to one.

After the input operand SB_Input_A has its bits switched as described above, the switched bit representation is processed so as to generate the triangular basis data element TB_Input_A.

Once the triangular basis of SB_Input_A is generated, the Hankel matrix is generated in the Hankel Matrix Generation block 212 in a conventional manner. Although the Hankel Matrix generation block 212 in the exemplary embodiment is configured for use with $GF(2^8)$, the same processing will produce a proper Hankel Matrix for fields of smaller order because the higher order terms in the operand TB_Input_A and the generator polynomial were set to zero for fields smaller than $GF(2^8)$, thereby producing a Hankel matrix with zeros in the unnecessary positions. The bit switching performed by the PolyInit block 300 ensures that the MSB of the data element is in the proper position for the Hankel Matrix Generator 212 processing. The elements of the Hankel matrix, which is an n×n matrix where n is the degree of the ground field, are shown below for values of n between three and eight, inclusive. In the following matrix illustration and equation, the elements $\tilde{a}_k$ are the TB data bits for $n-1 \geq k \geq 0$ and the elements $f_k$ are the ground field generator polynomial coefficients.

$$\begin{array}{r} n=3 \\ n=4 \\ n=5 \\ n=6 \\ n=7 \\ n=8 \end{array} \left( \begin{array}{cccccccc} \tilde{a}_0 & \tilde{a}_1 & \tilde{a}_2 \mid & \tilde{a}_3 \mid & \tilde{a}_4 \mid & \tilde{a}_5 \mid & \tilde{a}_6 \mid & \tilde{a}_7 \\ \tilde{a}_1 & \tilde{a}_2 & \tilde{a}_3 \mid & \tilde{a}_4 \mid & \tilde{a}_5 \mid & \tilde{a}_6 \mid & \tilde{a}_7 \mid & \tilde{a}_8 \\ \tilde{a}_2 & \tilde{a}_3 & \tilde{a}_4 \mid & \tilde{a}_5 \mid & \tilde{a}_6 \mid & \tilde{a}_7 \mid & \tilde{a}_8 \mid & \tilde{a}_9 \\ -- & -- & -- & \mid & \mid & \mid & \mid & \\ \tilde{a}_3 & \tilde{a}_4 & \tilde{a}_5 & \tilde{a}_6 \mid & \tilde{a}_7 \mid & \tilde{a}_8 \mid & \tilde{a}_9 \mid & \tilde{a}_{10} \\ -- & -- & -- & -- & \mid & \mid & \mid & \\ \tilde{a}_4 & \tilde{a}_5 & \tilde{a}_6 & \tilde{a}_7 & \tilde{a}_8 \mid & \tilde{a}_9 \mid & \tilde{a}_{10} \mid & \tilde{a}_{11} \\ -- & -- & -- & -- & -- & \mid & \mid & \\ \tilde{a}_5 & \tilde{a}_6 & \tilde{a}_7 & \tilde{a}_8 & \tilde{a}_9 & \tilde{a}_{10} & \tilde{a}_{11} \mid & \tilde{a}_{12} \\ -- & -- & -- & -- & -- & -- & \mid & \\ \tilde{a}_6 & \tilde{a}_7 & \tilde{a}_8 & \tilde{a}_9 & \tilde{a}_{10} & \tilde{a}_{11} & \tilde{a}_{12} \mid & \tilde{a}_{13} \\ -- & -- & -- & -- & -- & -- & -- & \\ \tilde{a}_7 & \tilde{a}_8 & \tilde{a}_9 & \tilde{a}_{10} & \tilde{a}_{11} & \tilde{a}_{12} & \tilde{a}_{13} & \tilde{a}_{14} \end{array} \right)$$

where:

-continued $$\tilde{a}_i = \sum_{l=0}^{n-1} a_{i-1-l} f_{n-1-l} \pmod{2} \quad n \le i \le 2n-2.$$

Following generation of the Hankel matrix, the Hankel matrix 214 and the TB_opsB 210 are delivered to the matrix-vector multiplication processing block 216. The matrix-vector multiplication is performed by an AND-XOR gate block for each row of the Hankel matrix, which results in fast, bit-parallel processing.

The product TB_result of the matrix-vector multiplication processing block 216 is provided to the TB to SB conversion block 220 to convert the product into the standard basis result output SB_RESULT 222 that is used in subsequent processing. The TB to SB conversion is performed according to the following equation, wherein $\tilde{u}_k$ are the bits of TB_result, $f_k$ are the bits of the generator polynomial, and $u_k$ are the bits of the SB_RESULT 222:

$$u_{n-1-i} = \sum_{l=0}^{i} \tilde{u}_{i=l} f_{n-l} \pmod{2} \quad 0 \le i \le n-1$$

The transformation performed in the TB to SB conversion block 220 is implemented by an AND-XOR logic block in preferred embodiments.

The above described triangular basis multiplier provides an efficient implementation for variable size ground fields. However, other ground field multiplier implementations could also be used to perform the multiplication.

The software functions which interface with the ground multiplier hardware processing block include POLINIT, GTB32 and MULXOR. The POLINIT function accepts the generator polynomial in its third operand and the size of the ground field in the fourth operand. The POLINIT function then configures the hardware with the generator polynomial and the PolyInit hardware described above. The POLINIT software command is used once at the beginning of processing to configure and initialize the ground field multiplier hardware, and is not used again until reconfiguration of the ground field multiplier through redefinition of the degree of the ground field or the generator polynomial is required.

The GTB32 instruction in the exemplary embodiment performs separate ground field multiplication for the four, eight bit slices contained in the two input operands contained in the third and fourth operands in the equation. The GTB32 function returns the product register, containing four eight bit slices, in the second operand. The MULXOR function is a multiply-accumulate function which performs a bit-wise exclusive-OR of the bits in the four, eight bit slices of the output of the four multipliers and places the eight bit result in the slice indicated by the fifth parameter.

The Third Processing Stage: Final KOA Processing

After multiplication of the ground field elements by the ground field multiplier, the third processing stage accepts the ground field multiplicands produced by the second multiplication stage, performs the final processing according to the KOA multiplication algorithm by combining the data received from the ground field multiplier and produces a binary multiplicand which is to be processed by a modulo reduction processing stage. The final KOA processing stage, referred to herein as the KOA3 stage, reduces the length of the data vectors produced by the ground field multiplier stage from $3^{\log_2(m)}$ elements to $2m-1$ elements. From this reduction there is obtained the polynomial C'(x) that will be processed by the modulo reduction block. The final KOA processing completes the KOA processing that was partially performed by the two preceding stages.

In the exemplary embodiment, the ground field multiplication is performed for each eight bit "slice" which corresponds to the ground field elements in the Galois Field multiplier input operands. The ground field multiplier in the exemplary embodiment produces a set of three, thirty-two bit output values that are the result of the ground field multiplication. Three registers are used to hold the GM_low 122, GM_middle, 124 and GM_high 126 ground field multiplier output data. The hardware processing of preferred embodiments which implements the third processing stage requires the input data registers to be configured differently than the configuration produced by the ground field multiplier for different sizes of the composite Galois Fields used. This different data register configuration improves the implementation efficiency of the third stage processing.

The exemplary embodiment rearranges the data registers used as input to the third stage processing by executing the arrange registers processing block 128 if the value of m, wherein m reflects the field degree in GF$((2^n)^m)$, is equal to four or eight (i.e., is not equal to one or two). In other words, the processing of the arrange registers block 128 depends upon the value of m.

The arrange register processing block 128 of the exemplary embodiment produces three, thirty-two bit values Kin_low 130, Kin_middle 132 and Kin_high 134 which are in the format required by the KOA3 processing block 140. The required input data format required for KOA3 processing is illustrated as:

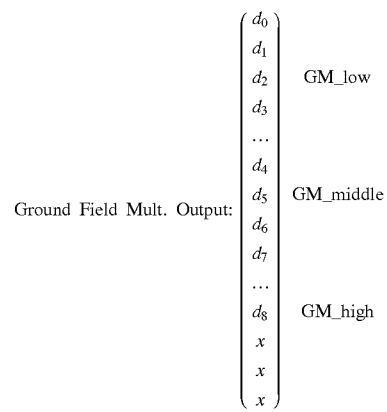

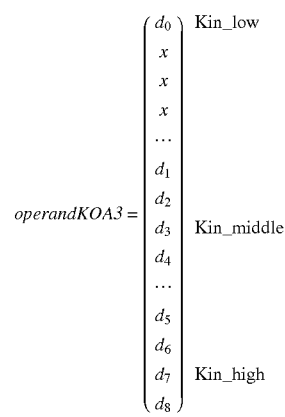

As shown in the above illustration of the KOA3 input data format, the arrange register processing block 128 accepts the ground field multiplier output registers GM_low 122, GM_middle 124 and GM_high 126 and rearranges the slice placement within those registers. The lowest order slice from the GM_low 122 register is placed into the low order slice of Kin_low, the three higher order slices of GM_low 122 and the lowest order slice of GM_middle 124 are placed into Kin_middle and the three higher order slices of GM_middle and the one data slice contained in GM_high 126 is placed into Kin_high.

The arrange register processing block 128 utilizes three instructions to implement the required data reorganization. More specifically, an SHXOR instruction is performed twice and a MASK3 instruction is performed once. The SHXOR instruction provides a slice shifting operation, which is a data shifting operation on a "slice" basis. In the SHXOR instruction, the eight bit slices are shifted to the next lowest order slice. The SHXOR instruction accepts two inputs. The least significant slice of the fourth operand is placed into the most significant slice of the output operand specified in the second operand, and the slices of the third operand are shifted to the next, less significant slice and placed into the output operand. The least significant slice of the third operand is not provided in the output operand. The arrange register processing block 128 also utilizes the MASK3 instruction to process the least significant order data register. The MASK3 instruction sets the three most significant slices of the register specified in the third operand (i.e., all slices except the least significant) to zero and returns the result in the second operand.

KOA3 Processing

The KOA3 processing block of the exemplary embodiment performs the data manipulation that implements the final KOA processing required to perform the multiplication of the two original input operands. Preferred embodiments utilize combinatorial logic blocks to perform most of the processing of this block. The data are provided to the hardware of the exemplary embodiment through software routines, which ensure the data is properly organized for processing. The data supplied to the KOA3 processing blocks is reorganized as required by the KOA3 processing hardware by the Arrange Registers block 128 if that is required by the size of the input Galois field.

Figure 4:
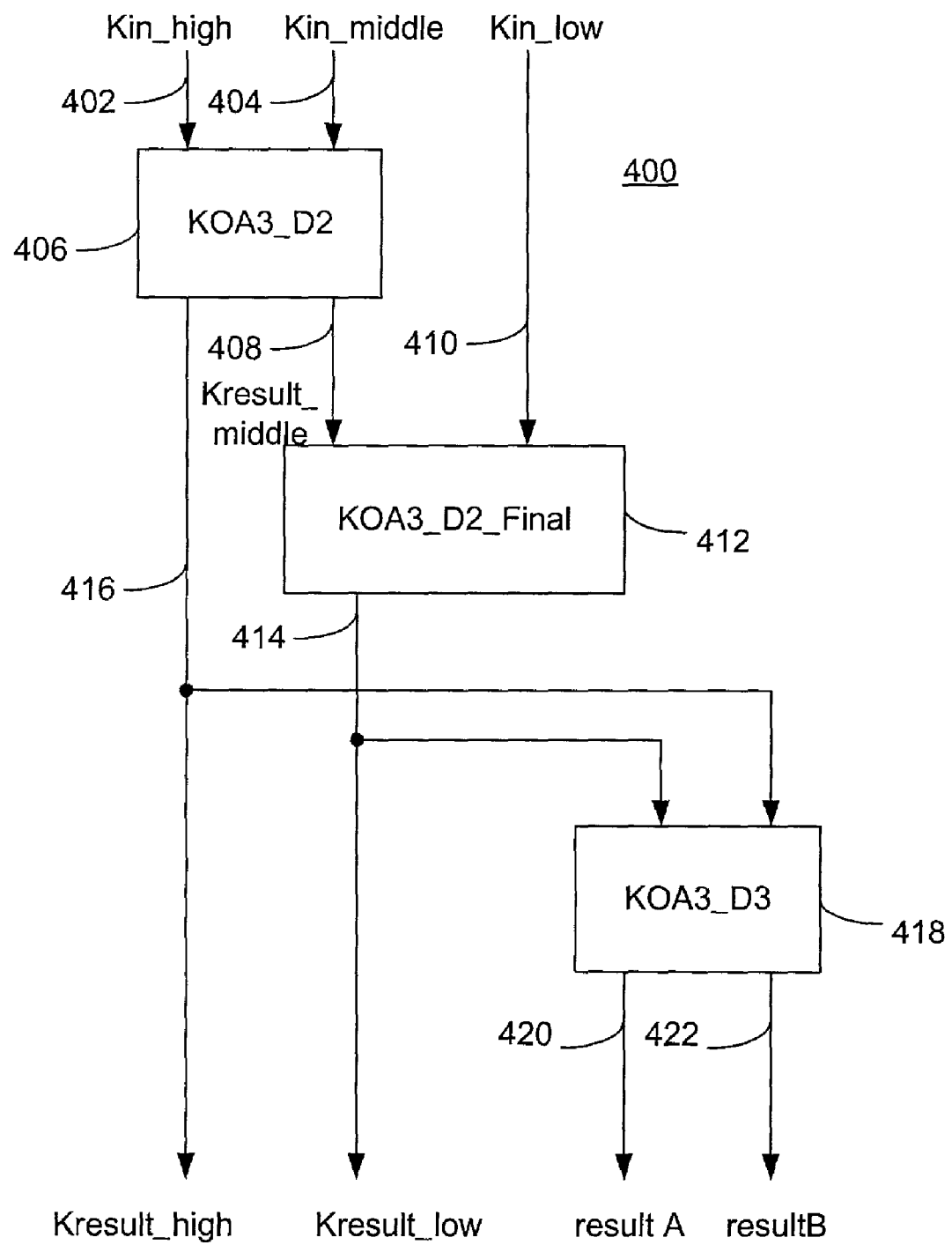
FIG. 4 is a block diagram illustrating in detail the KOA3 processing block of a preferred embodiment of the present invention.

A processing structure for the KOA3 block 140 of the exemplary embodiment is illustrated in FIG. 4. The hardware processing of the exemplary embodiment divides the KOA3 processing into the three processing blocks illustrated in FIG. 4. The division of the KOA3 processing in the exemplary embodiment is done to optimize implementation efficiency.

The initial processing of the KOA3 processing block is performed by processing block KOA3_D2, which accepts Kin_high 134 and Kin_middle 132. The output of processing block KOA3_D2 is illustrated in the following equation:

$$KOA3\_D2(operandKOA3) = \begin{pmatrix} d_1 + d_2 \\ d_2 + d_3 + d_6 \\ d_1 + d_2 + d_3 + d_4 + d_5 + d_6 + d_7 + d_8 \\ \overline{\phantom{d_1 + d_2 + d_3 + d_4 + d_5 + d_6 + d_7 + d_8}} \\ d_2 + d_5 + d_6 + d_8 \\ d_6 + d_7 + d_8 \\ d_8 \end{pmatrix} \begin{matrix} \\ \\ \text{Kresult\_middle} \\ \\ \\ \text{Kresult\_high} \\ \end{matrix}$$

The top three slices, which are each eight bits in size, comprise output Kresult_middle 408. The lower three slices of the output of processing block KOA3_D2, which are similarly eight bits each, are Kresult_high 416. The processing of the KOA3_D2 processing is implemented in the exemplary embodiment through two software instructions. The KOA3D2H software instruction accepts the two input data fields Kin_high and Kin_middle and produces the high order intermediate result Kresult_high. The KOA3D2M software instruction accepts the same two input data fields, Kin_high and Kin_middle, and produces the middle order intermediate result Kresult_middle. These functions accept the inputs Kin_high and Kin_middle as their third and fourth operands and produce their output in the second operand.

The operand Kresult_middle 408, which is produced by processing block KOA3_D2 through the software instruction KOA3DM, and the operand Kin_low 410, which is an input to the KOA3 processing block as generated by the arrange register processing block 128, are supplied to block KOA3_D2_Final 412. Block KOA3_D2_Final 412 transforms those data elements into output data element Kresult_low 414 according to the following equation, wherein $d_k$ is an eight bit slice within a thirty-two bit data register:

$$operand2F = \begin{pmatrix} d_1 + d_2 \\ d_2 + d_3 + d_6 \\ d_1 + d_2 + \cdots + d_7 + d_8 \\ \overline{\phantom{d_1 + d_2 + \cdots + d_7 + d_8}} \\ d_0 \end{pmatrix} \begin{matrix} \\ \text{Kresult\_middle} \\ \\ \\ \text{Kin\_low} \end{matrix}$$

$$KOA3\_D2\_Final(operand2F) =$$

$$Kresult\_low = \begin{pmatrix} d_0 \\ d_0 + d_1 + d_2 \\ d_0 + d_2 + d_3 + d_6 \\ d_0 + d_1 + d_2 + \cdots + d_7 + d_8 \end{pmatrix}$$

The processing of the KOA3_D2_Final processing block is implemented in the exemplary embodiment by the software function KOA3D2L. The KOA3D2L software function accepts the Kresult_middle 408 and Kinput_low 410 operands as its third and fourth operand and produces the Kresult_low 414 output in its second operand.

If m equals eight, the processing of block KOA3_D3 418 is performed. The exemplary embodiment makes two uses of the processing performed by the KOA3_D3 418 processing block. In a first use, the KOA3_D3 processing block is supplied inputs Kresult_low 414 and Kresult_high 416 and is used to produce the result data elements resultA 420 and resultB 422 according to the following equation:

$$operand33 = \begin{pmatrix} D_0 \\ D_1 \\ D_2 \\ D_3 \\ \overline{\phantom{D_3}} \\ D_4 \\ D_5 \\ D_6 \end{pmatrix} \begin{matrix} \\ opA \\ \\ \\ \\ \\ opB \\ \end{matrix}$$

-continued $$result(operand33) = \begin{pmatrix} D_0 + D_4 \\ D_1 + D_5 \\ D_2 + D_6 \\ D_3 \\ \overline{\phantom{XXX}} \\ D_4 \\ D_5 \\ D_6 \end{pmatrix} \begin{matrix} resA \\ \\ \\ \\ \\ resB \\ \\ \end{matrix}$$

In a second use, this processing block is used in an "Inverse" mode to produce the following transformation:

$$operand33i = \begin{pmatrix} D_0 \\ D_1 \\ D_2 \\ D_3 \\ \overline{\phantom{XX}} \\ D_4 \\ D_5 \\ D_6 \end{pmatrix} \begin{matrix} opB\_inv \\ \\ \\ \\ \\ opA\_inv \\ \\ \end{matrix}$$

$$result(operand33i) = \begin{pmatrix} D_0 \\ D_1 \\ D_2 \\ D_3 \\ \overline{\phantom{XXX}} \\ D_0 + D_4 \\ D_1 + D_5 \\ D_2 + D_6 \end{pmatrix} \begin{matrix} resB\_inv \\ \\ \\ \\ \\ resA\_inv \\ \\ \end{matrix}$$

The inverse mode is used to calculate an intermediate product within the output of the KOA3 processing module. The processing of the KOA3D3 block is the same for both the direct and inverse mode, but the inputs are configured differently in order to realize the above results.

Figure 5:
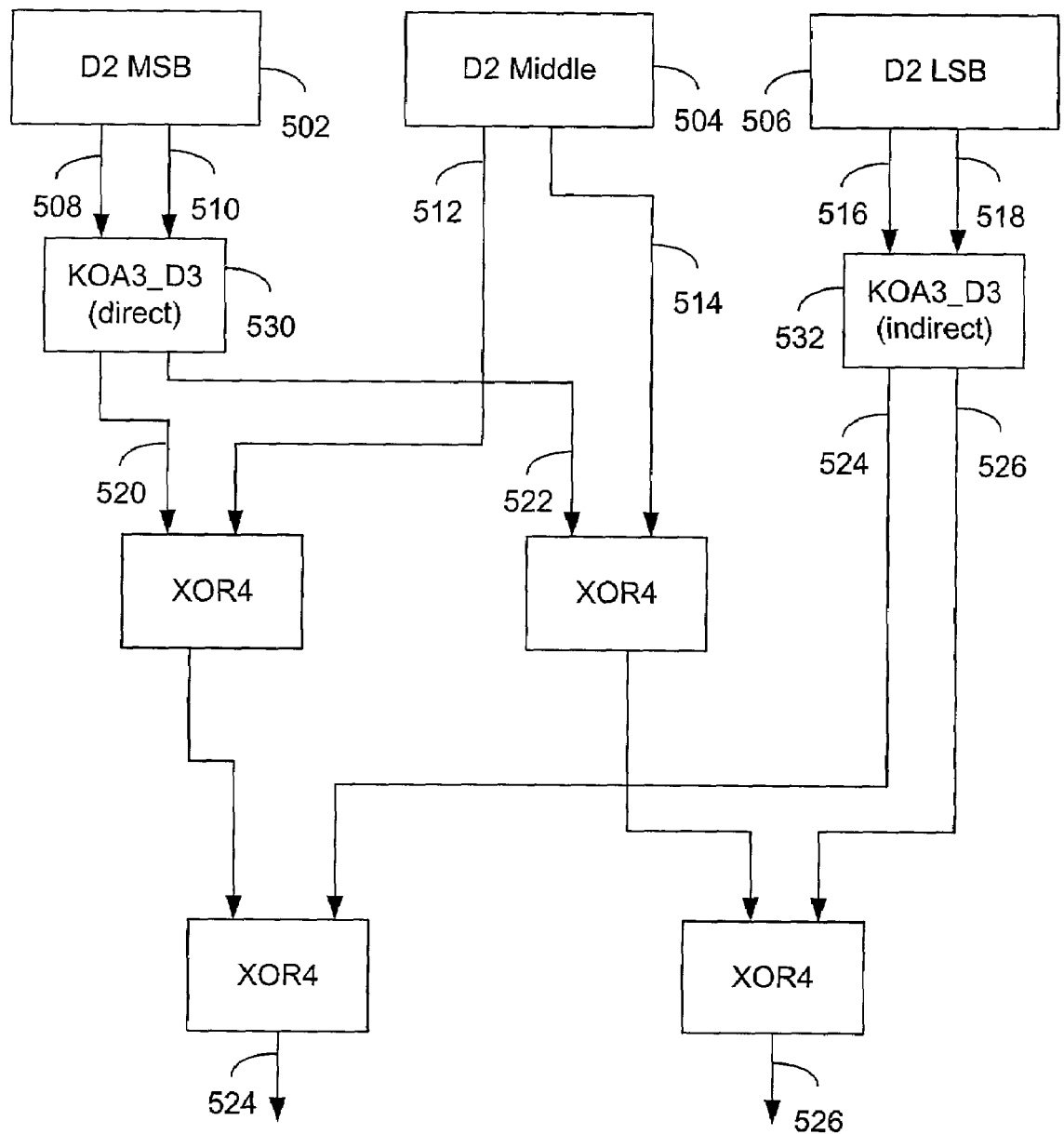
FIG. 5 is a block diagram illustrating the processing of the final stage of the KOA3 processing block according to a preferred embodiment of the present invention.

The KOA3D3 block operation 500 in the case of m equals eight is illustrated in FIG. 5. In the case of m equals eight, the software processing illustrated below shows that the KOA3D2 processing block produces six data registers. These six data registers are two registers, identified as the "high" and "low" registers, for each for the Kresult_high, Kresult_middle and Kresult_low data elements. These three data elements are produced by the respective portions of the KOA3D2 processing that are illustrated in FIG. 5 as D2 MSB 502, D2 Middle 504 and D2 LSB 506. Two registers for each of these three data elements is required due to the dimension of these data elements in the case of m equal to eight. These three data elements are shown in FIG. 5 as High_Kresult_high 508, Low_Kresult_high 510, High_Kresult_middle 512, Low_Kresult_middle 514, High_Kresult_low 516, and Low_Kresult_low 518. The High_Kresult_high 508 and Low_Kresult_high 510 are processed conventionally with the direct KOA3_D3 processing module 530. The High_Kresult_low 516 and Low_Kresult_low 518 are processed by the inverse KOA3_D3 processing module 532. The output of the KOA3_D3 processing, $D_{3(8)}$, is illustrated below, wherein the eight bit data elements $d_0$ through $d_{26}$ are the input to the KOA3 processing block. The direct and inverse KOA3_D3 processing modules are used to calculate part of the values within the center set of seven rows of the $D_{3(8)}$ matrix, which comprise the D3_middle quantity.

$$D_{3(8)} = \begin{pmatrix} d_0 \\ d_0 + d_1 + d_2 \\ d_0 + d_2 + d_3 + d_6 \\ d_0 + d_1 + d_2 + d_3 + d_4 + d_5 + d_6 + d_7 + d_8 \\ \overline{\phantom{XXXXXXXXXXXXXXXXXXXXXXXXXXXXXX}} \\ d_0 + d_2 + d_5 + d_6 + d_8 + d_9 + d_{18} \\ d_0 + d_1 + d_2 + d_6 + d_7 + d_8 + d_9 + d_{10} + d_{11} + d_{18} + d_{19} + d_{20} \\ d_0 + d_2 + d_3 + d_6 + d_8 + d_9 + d_{11} + d_{12} + d_{15} + d_{18} + d_{20} + d_{21} + d_{24} \\ d_0 + d_1 + d_2 + \cdots + d_{24} + d_{25} + d_{26} \\ d_2 + d_5 + d_6 + d_8 + d_{11} + d_{14} + d_{15} + d_{17} + d_{18} + d_{20} + d_{23} + d_{24} + d_{26} \\ d_6 + d_7 + d_8 + d_{15} + d_{16} + d_{17} + d_{18} + d_{19} + d_{20} + d_{24} + d_{25} + d_{26} \\ d_8 + d_{17} + d_{18} + d_{20} + d_{21} + d_{24} + d_{26} \\ \overline{\phantom{XXXXXXXXXXXXXXXXXXXXXXXXXXXXXX}} \\ d_{18} + d_{19} + d_{20} + d_{21} + d_{22} + d_{23} + d_{24} + d_{25} + d_{26} \\ d_{20} + d_{23} + d_{24} + d_{26} \\ d_{24} + d_{25} + d_{26} \\ d_{26} \end{pmatrix}$$

The output of the D3_middle values within the output of the KOA3 processing block in the case of m equals eight are contained in the high D3_middle output 524 and D3 middle low output 526.

The processing of the KOA3D3 block 418 is performed by execution of two software functions which provide an interface to the specialized processing hardware. The KOA3D3H and KOA3D3L functions perform this interfacing and are used when m is equal to eight. The KOA3D3H function accepts the Kresult_high and Kresult_low operands in its third and fourth operand and produces the resultB output in its second operand. The KOA3D3L function accepts the Kresult_high and Kresult_low operands in its third and fourth operand and produces the resultA output in its second operand. The use of the KOA3D3 processing block is illustrated below by the exemplary software processing.

The KOA3 processing block 140 produces output values KOA3outHigh 142 and KOA3outLow 144. KOA3outHigh 142 is supplied to the modulo reduction processing block 146 in the exemplary embodiment.

The software functions which implement the execution of the KOA3 functions are KOA3D2H, KOA3D2M, KOA3D2L, KOA3D3H and KOA3D3L. The KOA3D2L function accepts the Kresult_middle 408 and Kin_low 410 operands as its third and fourth operand and produces the Kresult_low 414 output as an output in its second operand. The KOA3D3H and KOA3D3L functions interface to the hardware which performs the operation of KOA3_D3 as described above. The KOA3D3H and KOA3D3L functions are used when m is equal to eight, and perform the processing described above.

In the case in which m equals two, the data produced by the third multiplication stage of the exemplary embodiment must be reorganized for proper processing by the modulo reduction processing block. The instruction SHL2 is used to reorganize this data. The SHL2 instruction transfers the least significant slice of the register specified in the third operand to the next most significant slice and sets the least significant slice to zero.

Modulo Reduction

The modulo reduction block accepts the output of the final KOA processing and performs the modulo reduction required to map the output of the above multiplication processing into the finite field that comprises the output from the Galois field multiplier.

The modulo reduction processing block 146 of the exemplary embodiment performs modulo reduction by matrix-vector multiplication. In the preferred embodiment, the result of the KOA3 processing block produces a polynomial of degree up to 2m−2. In order for the result to correspond to $GF((2^n)^m)$, the result must be reduced modulo the generator polynomial for $GF(2^m)$. The output of the KOA3 process may be represented by a vector with elements $c'_k$, where $2v-2 \geq k \geq 0$ and the modulus of that vector with the generator polynomial for $GF(2^m)$, which is represented by the coefficients $p_k$, is given by the equation:

$$\begin{pmatrix} C_0 \\ C_1 \\ \vdots \\ C_{v-1} \end{pmatrix} = \begin{pmatrix} 1 & 0 & \cdots & 0 & r_{0,0} & \cdots & r_{0,v-2} \\ 0 & 1 & \cdots & 0 & r_{1,0} & \cdots & r_{1,v-2} \\ \vdots & \vdots & \ddots & \vdots & \vdots & \ddots & \vdots \\ 0 & 0 & \cdots & 1 & r_{v-1,0} & \cdots & r_{v-1,v-2} \end{pmatrix} \begin{pmatrix} c'_0 \\ \vdots \\ c'_{v-1} \\ c'_v \\ \vdots \\ c'_{2v-2} \end{pmatrix}$$

where $$r_{ij} = \begin{cases} p_j; & j=0, \cdots, m-1; i=0 \\ r_{j-1,i-1} + r_{m-1,i-1} r_{j0}; & j=0, \cdots, m-1; i=1, \cdots, m-1 \end{cases}$$

and $r_{j-1,i-1} = 0$ if $j=0$

The rightmost part of the two dimensional matrix in the above equation is referred to as the reduction matrix R and has dimensions (m, m−1) with elements that are within $GF(2^n)$. The leftmost portion of the two dimensional matrix contains fixed identity values (which may be implemented by hard wiring) that are used to perform the matrix multiplication. The exemplary embodiment of the present invention performs case particular processing to implement the multiplication of the reduction matrix with the high order half of the multiplier output KOA3outHigh 142. The suitable reduction matrix is generated by software in the exemplary embodiment based upon the value of m, and the processing to utilize the multiplication hardware to perform the multiplication of the reduction matrix with the data vector is performed differently based upon the value of m.

In the exemplary embodiment, the ground field is of degree $GF(2^8)$ or less, and the elements of the ground field fit in eight bits. The exemplary embodiment further utilizes thirty-two bit registers to contain data, which is organized as four, eight bit slices to represent composite field data. For m equal to two, the reduction matrix contains only two elements, and is contained within one register. For m equal to four, the reduction matrix contains four rows and three columns. The three columns of each row are stored within the same register, and each row is stored in a different register.

In the case of m equals eight, the reduction matrix is eight by seven. The seven columns of each row of this reduction matrix require two registers to hold the data. The eight by seven reduction matrix R is conceptually reorganized into a single, thirty-two bit register per element, column vector MR. The column vector MR contains sixteen elements which each contain up to four, eight bit coefficients. This allows each "row" to be contained within one register. The structure of the matrix reorganization is illustrated below, wherein sub-matrices I and III have dimensions of four by three (i.e., the elements of groups I and III each contain three coefficients) and sub-matrices II and IV have dimensions of four by four (i.e., the elements of groups II and IV each contain four coefficients):

$$R = \begin{bmatrix} I & | & II \\ -- & -- & -- \\ III & | & IV \end{bmatrix} \quad MR = \begin{bmatrix} I \\ -- \\ II \\ -- \\ III \\ -- \\ IV \end{bmatrix}$$

The specific modulo reduction processing for the different cases is illustrated in the software listings provided below.

The modulo reduction processing block 146 utilizes the OPB2 and OPB8 software instructions for some values of m. The OPB2 software instruction is used for the case of m equals two and copies slice 2 of the third parameter into slices 0 and 1 of the second parameter. This operation is used to prepare the operands for the matrix-vector multiplication that is performed by the GTB32 function. The result of OPB2 will be one of the inputs of the GTB32 function. The other input is the MR vector constructed for the case of m equal to 2. The MR vector, as described above, comprises only one "row," which contains the coefficients r00 and r01 in its slices 0 and 1, respectively, when m equals 2.

The OPB8 software instruction is used for the case of m equals eight and prepares the operand for modulo reduction processing. The OPB8 instruction is used to combine the data produced by the last KOA processing block for proper processing by the modulo reduction block. An intermediate data register of the exemplary embodiment contains three data slices with the least significant slice empty. A value from another intermediate result register is then copied into that least significant data slice. The processing of the OPB8 takes the least significant data slice (i.e., slice 0) from the third parameter and the three most significant data slices (i.e., slice 1, slice 2 and slice 3) from the fourth parameter and places them into the corresponding slices of the second parameter.

The elements of the reduction matrix are generated by software functions in the exemplary embodiment. The LDMAT instruction loads elements of the reduction matrix into its second operand one row at a time. The row of the reduction matrix that is loaded into the second operand is specified by the immediate value specified in the fifth operand. The definition of row number for the rows of the reduction matrix utilized for the case of m equal to eight is described above.

For m equals four and m equals eight, the special ground field multiplier invoked by the MULXOR instruction is used instead of GTB32. The operation performed by the MULXOR instruction is a ground field multiplier which produces an intermediate register that contains four slices. The MULXOR instruction further performs an addition of all the slices contained in that intermediate register. The sum of the slices is stored in the slice of the result register specified by the fifth operand of the MULXOR instruction.

XOR4 Processing Block

The XOR4 block of the Galois field multiplier utilizes a generalized Exclusive-OR processing block which performs a bit-wise exclusive-OR for the four, eight bit slices contained within the two, thirty-two bit data registers that are provided as input. Preferred embodiments utilize this processing to perform the final processing of the modulo reduction processing. The input of the XOR4 block is the output of the modulo reduction processing and the Least Significant Output register (or two registers if m equals eight) of the third KOA processing block. The processing performed within this block is dependent upon the value of m for the composite field being processed, and is described for each case in the software processing description for each value of m implemented in the exemplary embodiment.

The XOR4 software function, used by the XOR4 block 150 and for other processing within the exemplary embodiment, produces a bit-wise Exclusive-OR function for each bit in the two, thirty-two bit input data registers specified in the third and fourth operand, and returns the results in the second operand.

Map from Composite Field

After modulo reduction is performed upon the results of the KOA3 processing block, the Map from composite field block converts the data back into the finite field that corresponds to the original input parameters (Input_A 102 and Input_B 104). This inverse transformation is performed in the exemplary embodiment by a matrix-vector multiplication using the inverse of the matrix calculated by the map to composite fields processing block 106a, 106b. After the transformation performed by this last block, the output 158 is produced for the Flexible Galois Field multiplier 100.

The software functions which are used to map from the composite field are CNVNM2K and CNVNM2K_8. These functions accept one register of data in their third operand and produce the output in the second operand. The CNVNM2K_8 function is used when m equals eight and is used twice for the two registers which hold the sixty-four bit data. The CNVNM2K function is used for other cases.

3. Software Processing to Implement Ground Field Multiplication

The processing to implement multiplication over Galois Fields of a degree of the ground field (i.e., over Galois Fields of degree up to $GF(2^8)$ in the exemplary embodiment) is performed by the following processing.

```
{LDPOLY, R0, x, x, 0},      //get the ground field generator polynomial
{LDn, R1, x, x, 0},          //get the size n of the ground field
{LDop, R2, RInput_A, x, 0},  //get the operands
{LDop, R3, RInput_B, x, 0},
{POLINIT, x, R0, R1, 0},     //start the real multiplication
{GTB32, R4, R2, R3, 0},
{HALT, x, x, x, 0},
```

4. Software Processing to Implement Multiplication Over $GF(2^{16})$

The processing to implement multiplication over Galois Fields where m equals two (e.g., over Galois Field $GF(2^{16})$) is performed with the following processing.

```
//initialization phase
//load the needed variables in the appropriate registers
{MVI, R0, x, x, 0x12d},     //get the ground field generator polynomial
{MVI, R1, x, x, 0x8},        //get the size n of the ground field (n=8)
{LDop, R3, RInput_A, x, 0}, //get the operands
{LDop, R4, RInput_B, x, 0},
//multiplication begins
{CNVK2NM, R3, R3, x, 0},    // convert the operands to CF
{CNVK2NM, R4, R4, x, 0},
//KOA_1
{KOA1L, R5, R3, x, 0},
{MSK, R5, R5, x, 0},         // the result has to be on 24 bits, not 32
{KOA1L, R6, R4, x, 0},
{MSK, R6, R6, x, 0},
//ground multiplication
{POLINIT, x, R0, R1, 0},
{GTB32, R3, R5, R6, 0},
//KOA_3
{KOA3D2H, R5, R3, R3, 0},   // KOA_3_D1
{SHL2, R6, R3, x, 0},        // Result of Shuffle
{XOR4, R7, R5, R6, 0},       // Result of KOA_3
//modulo reduction
{OPB2, R8, R7, x, 16},       //prepare Input_B for modulo reduction
{LDMAT, R4, x, x, 0},        // load the reduction matrix MR
{GTB32, R2, R4, R8, 0},      // do the matrix-vector product
{XOR4, R3, R2, R7, 0},       // compute the final result
{CNVNM2K, R4, R3, x, 0},    // convert back from composite fields
{HALT, x, x, x, 0},
```

5. Software Processing to Implement Multiplication Over $GF(2^{32})$

The processing to implement multiplication over Galois Fields where m equals four (e.g., over Galois Field $GF(2^{32})$) is performed with the following processing.

```
//initialization phase
//load the needed variables in the appropriate registers
{MVI, R0, x, x, 0xFFF},     //get the ground field generator polynomial
{MVI, R1, x, x, 0x8},        //get the size n of the ground field (n=8)
{LDop, R2, RInput_A, x, 0}, //get the operands
{LDop, R3, RInput_B, x, 0},
//multiplication begins
{CNVK2NM, R2, R2, x, 0},    // convert the operands to CF
{CNVK2NM, R3, R3, x, 0},
//KOA_1 on Input_A
{KOA1H, R4, R2, x, 0},
{KOA1M, R5, R2, x, 0},
{KOA1L, R6, R2, x, 0},
//KOA_1 on Input_B
{KOA1H, R7, R3, x, 0},
{KOA1M, R8, R3, x, 0},
{KOA1L, R9, R3, x, 0},
//GTB mult
{POLINIT, x, R0, R1, 0},
{GTB32, R2, R4, R7, 0}, // MSB terms
{GTB32, R3, R5, R8, 0}, // middle terms
{GTB32, R4, R6, R9, 0}, // LSB terms
//adjust operands for KOA3
{MASK3, R5, R4, x, 0},       //new LSB register
{SHXOR, R4, R4, R3, 0},      //new middle register
{SHXOR, R3, R3, R2, 0},      //new MSB register
//KOA3_D2
{KOA3D2H, R5, R3, R4, 0},
{KOA3D2M, R6, R3, R4, 0},
{KOA3D2L, R7, R6, R5, 0},
//modulo reduction
{LDMAT, R6, x, x, 0},        // first row (MSB)
```

-continued

```
{MULXOR, R2, R6, R5, 0},     // do the matrix-vector multiplication and
                              put the
                              //results in slice 0
{LDMAT, R6, x, x, 1},        // second row
{MULXOR, R3, R6, R5, 1},
{LDMAT, R6, x, x, 2},        // third row
{MULXOR, R4, R6, R5, 2},
{LDMAT, R6, x, x, 3},        // fourth row (LSB)
{MULXOR, R5, R6, R5, 3},
//combine the results of modulo reduction
{XOR4, R6, R2, R3, 0},
{XOR4, R2, R4, R5, 0},
{XOR4, R3, R2, R6, 0},
{XOR4, R5, R3, R7, 0},       //final result of modulo reduction
//conversion from CF
{CNVNM2K, R5, R5, x, 0},
{HALT, x, x, 0},
```

6. Software Processing to Implement Multiplication Over $GF(2^{64})$

The processing to implement multiplication over Galois Fields where m equals eight (e.g., over Galois Field $GF(2^{64})$) is performed with the following processing.

```
//initialization phase
//load the needed variables in the appropriate registers
{MVI, R0, x, x, 0xFFF},      //get the ground field generator
                              polynomial
{MVI, R1, x, x, 0x8},        //get the size n of the ground
                              field (n=8)
//get the operands
{LDop, R2, RInput_A_H, x, 0},  // MSB bits
{LDop, R3, RInput_A, x, 0},    // LSB bits
{LDop, R4, RInput_B_H, x, 0},
{LDop, R5, RInput_B, x, 0},
// multiplication starts
//convert to CF
{CNVK2NM_8, R2, R2, x, 0},     // Input_A_H
{CNVK2NM_8, R3, R3, x, 0},     // Input_A_L
{CNVK2NM_8, R4, R4, x, 0},     // Input_B_H
{CNVK2NM_8, R5, R5, x, 0},     // Input_B_L
//KOA_1
// Input_A_H
{KOA1H, R20, R2, x, 0},        //MSB
{KOA1M, R19, R2, x, 0},        //middle
{KOA1L, R18, R2, x, 0},        //LSB
// Input_A_L
{KOA1H, R17, R3, x, 0},        //MSB
{KOA1M, R16, R3, x, 0},        //middle
{KOA1L, R15, R3, x, 0},        //LSB
// Input_B_H
{KOA1H, R14, R4, x, 0},        //MSB
{KOA1M, R13, R4, x, 0},        //middle
{KOA1L, R12, R4, x, 0},        //LSB
// Input_B_L
{KOA1H, R11, R5, x, 0},        //MSB
{KOA1M, R10, R5, x, 0},        //middle
{KOA1L, R9, R5, x, 0},         //LSB
// Input_A_middle
{XOR4, R8, R20, R17, 0},       //MSB
{XOR4, R7, R19, R16, 0},       //middle
{XOR4, R6, R18, R15, 0},       //LSB
// Input_B_middle
{XOR4, R5, R14, R11, 0},       //MSB
{XOR4, R4, R13, R10, 0},       //middle
{XOR4, R3, R12, R9, 0},        //LSB
//GTB
//GTB_res_H
{POLINIT, x, R0, R1, 0},
{GTB32, R20, R20, R14, 0},     // MSB
{GTB32, R19, R19, R13, 0},     // middle
{GTB32, R18, R18, R12, 0},     // LSB
//GTB_res_middle
{GTB32, R8, R8, R5, 0}, // MSB
```

-continued

```
{GTB32, R7, R7, R4, 0}, // middle
{GTB32, R6, R6, R3, 0}, // LSB
//GTB_res_L
{GTB32, R17, R17, R11, 0},      // MSB
{GTB32, R16, R16, R10, 0},      // middle
{GTB32, R15, R15, R9, 0},       // LSB
//adjust the registers for KOA3
//H registers
{MASK3, R9, R18, x, 0},         //new LSB register
{SHXOR, R10, R19, R19, 0},      //new middle register
{SHXOR, R11, R19, R20, 0},      //new MSB register
//middle registers
{MASK3, R12, R6, x, 0},         //new LSB register
{SHXOR, R13, R6, R7, 0},        //new middle register
{SHXOR, R14, R7, R8, 0},        //new MSB register
//L registers
{MASK3, R6, R15, x, 0},         //new LSB register
{SHXOR, R7, R15, R16, 0},       //new middle register
{SHXOR, R8, R16, R17, 0},       //new MSB register
//KOA3
//D2
//MSB registers
{KOA3D2H, R20, R11, R10, 0},    //MSB
{KOA3D2M, R19, R11, R10, 0},    //MIDDLE
{KOA3D2L, R18, R19, R9, 0},     //LSB
// MIDDLE REGISTERS
{KOA3D2H, R17, R14, R13, 0},    //MSB
{KOA3D2M, R16, R14, R13, 0},    //MIDDLE
{KOA3D2L, R15, R16, R12, 0},    //LSB
// LSB registers
{KOA3D2H, R14, R8, R7, 0},      //MSB
{KOA3D2M, R13, R8, R7, 0},      //MIDDLE
{KOA3D2L, R12, R13, R6, 0},     //LSB
//D3 MIDDLE
//direct
{KOA3D3H, R5, R18, R20, 0},     // a_MSB
{KOA3D2L, R9, R18, R20, 0},     // a_LSB
//inverse
{KOA3D3H, R10, R12, R14, 0},    // c_MSB
{KOA3D2L, R11, R12, R14, 0},    // c_LSB
{XOR4, R15, R5, R17, 0},        // b_MSB
{XOR4, R13, R9, R15, 0},        // b_LSB
{XOR4, R16, R13, R11, 0},       // MSB
{XOR4, R19, R15, R10, 0},       // LSB
//modulo reduction
{OPB8, R12, R12, R17, 0},       // arrange one of the operands
                                 for modulo reduct.
{LDMAT, R17, x, x, 0},          // row 0
{MULXOR, R5, R17, R14, 0},
{LDMAT, R17, x, x, 1},          // row 1
{MULXOR, R6, R17, R14, 1},
{LDMAT, R17, x, x, 2},          // row 2
{MULXOR, R7, R17, R14, 2},
{LDMAT, R17, x, x, 3},          // row 3
{MULXOR, R9, R17, R14, 3},
{XOR4, R5, R5, R6, 0},
{XOR4, R6, R7, R9, 0},
{XOR4, R5, R5, R6, 0},          //OUT1
{LDMAT, R17, x, x, 4},          // row 4
{MULXOR, R6, R17, R12, 0},
{LDMAT, R17, x, x, 5},          // row 5
{MULXOR, R7, R17, R12, 1},
{LDMAT, R17, x, x, 6},          // row 6
{MULXOR, R9, R17, R12, 2},
{LDMAT, R17, x, x, 7},          // row 7
{MULXOR, R10, R17, R12, 3},
{XOR4, R6, R6, R7, 0},
{XOR4, R9, R9, R10, 0},
{XOR4, R6, R6, R9, 0},          //OUT3
{XOR4, R5, R5, R6, 0},          //MODRED_MSB
{LDMAT, R17, x, x, 8},          // row 8
{MULXOR, R6, R17, R14, 0},
{LDMAT, R17, x, x, 9},          // row 9
{MULXOR, R7, R17, R14, 1},
{LDMAT, R17, x, x, 10},         // row 10
{MULXOR, R9, R17, R14, 2},
{LDMAT, R17, x, x, 11},         // row 11
{MULXOR, R10, R17, R14, 3},
```

-continued

```
{XOR4, R6, R6, R7, 0},
{XOR4, R9, R9, R10, 0},
{XOR4, R6, R6, R9, 0},            //OUT2
{LDMAT, R17, x, x, 12},           // row 12
{MULXOR, R7, R16, R12, 0},
{LDMAT, R17, x, x, 13},           // row 13
{MULXOR, R9, R17, R12, 1},
{LDMAT, R17, x, x, 14},           // row 14
{MULXOR, R10, R17, R12, 2},
{LDMAT, R17, x, x, 15},           // row 15
{MULXOR, R11, R17, R12, 3},
{XOR4, R7, R7, R9, 0},
{XOR4, R10, R10, R11, 0},
{XOR4, R7, R7, R10, 0},           //OUT4
{XOR4, R6, R6, R7, 0},            // MODRED_LSB
{XOR4, R5, R5, R14, 0},           // RES_MSB
{XOR4, R6, R6, R4, 0},            // RES_LSB
// conversion from CF
{CNVNM2K_8, R5, R5, x, 0},        // MSB
{CNVNM2K_8, R6, R6, x, 0},        // LSB
{HALT, x, x, x, 0},
```

7. Practical Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory. Disk drive memory, CD-ROM, and other permanent storage. Additionally, a computer medium may include, for example, volatile storage such as RAM, buffers, and cache memory.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A hardware implemented Galois field multiplier comprising:
   an input operand mapper for mapping two input operands into two mapped input operands in a composite finite field that is defined by a first irreducible polynomial of degree m*n, the first irreducible polynomial being defined by using a ground field that is defined by a second irreducible polynomial of degree n and by using an extension field that is defined by a third irreducible polynomial of degree m;
   an initial KOA processor for performing an initial KOA processing upon the two mapped input operands to produce first result vectors;
   a triangular basis ground field multiplier for performing multiplication in the ground field to produce a multiplier output; and
   an output for providing the multiplier output.

2. The hardware implemented Galois field multiplier of claim 1,
   wherein the initial KOA processor transforms each of the two mapped input operands that each include four sub-elements ($a_0$, $a_1$, $a_2$, $a_3$) into a respective result vector within the first result vectors that is defined by:

$$\begin{pmatrix} a_0 \\ a_0 + a_1 \\ a_1 \\ a_0 + a_2 \\ \hline a_0 + a_1 + a_2 + a_3 \\ a_1 + a_3 \\ a_2 \\ a_2 + a_3 \\ \hline a_3 \\ x \\ x \\ x \end{pmatrix}$$

wherein the "+" operator represents a bit-wise exclusive-OR operation and "x" indicates unused or undefined values.

3. The hardware implemented Galois field muhiplier of claim 1, further comprising a final KOA processor for performing a final KOA processing of the multiplier output, the final KOA processing being divided into a plurality of uniform subsets such that the uniform subsets are scalable for processing of different values of m used to define the extension field.

4. The hardware implemented Galois field multiplier of claim 1, wherein the first, second, and third irreducible polynomials are used-defined.

5. A hardware implemented finite field data multiplier for multiplying two elements of a finite field that correspond to two input operands, the multiplier comprising:
   an input operand mapper for mapping two input operands into two mapped input operands in a composite finite field that is defined by a first irreducible polynomial of degree m*n, the first irreducible polynomial being defined by using a ground field that is defined by a second irreducible polynomial of degree n and by using an extension field that is defined by a third irreducible polynomial of degree m;

an initial KOA processor for performing an initial KOA processing upon each of the two mapped input operands to produce first result vectors, the initial KOA processor dividing the mapped input operands into a plurality of uniform subsets such that the uniform subsets are scalable for processing of different values of m used to define the extension field;

a multiplier means for performing a subsequent multiplication processing upon a result from the initial KOA processor to produce a multiplicative product over the composite finite field; and a multiplier output for providing the multiplicative product.

6. The hardware implemented multiplier of claim 5, wherein the initial KOA processor produces a plurality of output operands that each are within the ground field.

7. The hardware implemented multiplier of claim 5, wherein the first, second, and third irreducible polynomials are used-defined.

8. A machine-readable medium encoded with a program for multiplying two elements of a finite field that correspond to two input operands, said program containing instructions for performing the steps of:

mapping two input operands into two mapped input operands in a composite finite field that is defined by a first irreducible polynomial of degree m*n, the first irreducible polynomial being defined by using a ground field that is defined by a second irreducible polynomial of degree n and by using an extension field that is defined by a third irreducible polynomial of degree m;

performing an initial KOA processing upon the two mapped input operands to produce first result vectors;

performing multiplication of the first result vectors in the ground field using a triangufar basis multiplier to produce a multiplier output; and providing the multiplier output.

9. The machine-readable medium of claim 8, wherein the step of performing the initial KOA processing includes the sub-step of:

transforming each of the two mapped input operands that each include four sub-elements ($a_0$, $a_1$, $a_2$, $a_3$) into a respective result vector within the first result vectors that is defined by:

$$\begin{pmatrix} a_0 \\ a_0 + a_1 \\ a_1 \\ a_0 + a_2 \\ --- \\ a_0 + a_1 + a_2 + a_3 \\ a_1 + a_3 \\ a_2 \\ a_2 + a_3 \\ -------- \\ a_3 \\ x \\ x \\ x \end{pmatrix}$$

wherein the "+" operator represents a bit-wise exclusive-OR operation and "x" indicates unused or undefined values.

10. The machine-readable medium of claim 8, wherein said program further contains instructions for performing the step of performing a final KOA processing of the multiplier output, the final KOA processing being divided into a plurality of uniform subsets such that the uniform subsets are scalable for processing of different values of m used to define the extension field.

11. A machine-readable medium encoded with a program for multiplying two elements of a finite field that correspond to two input operands, said program containing instructions for performing the steps of:

mapping two input operands into two mapped input operands in a composite finite field that is defined by a first irreducible polynomial of degree m*n, the first irreducible polynomial being defined by using a ground field that is defined by a second irreducible polynomial of degree n and by using an extension field that is defined by a third irreducible polynomial of degree m;

performing an initial KOA processing upon each of the two mapped input operands to produce first result vectors, the initial KOA processing being divided into a plurality of uniform subsets such that the uniform subsets are scalable for processing of different values of m used to define the extension field;

performing a subsequent multiplication processing upon a result of the initial KOA processing to produce a multiplicative product over the composite finite field; and providing the multiplicative product as an output.

12. The machine-readable medium of claim 11, wherein the step of performing the initial KOA processing includes the sub-step of producing a plurality of output operands that each are within the ground field.

13. A machine-readable medium encoded with a program for performing a machine implemented meThod for multiplying two elements corresponding to a first multiplicand and a second multiplicand of a finite field, with an initial basis, that is redefinable, the method comprising the steps of:

switching data bit ordering of a plurality of data bits representing a first multiplicand to produce a first bit switched multiplicand, such that a most significant bit of the first multiplicand is placed into a least significant bit position regardless of the number of bits in the plurality of data bits representing the first multiplicand, successively less significant bits are placed into successively more significant bit positions relative to the least significant bit position, and unused bits are set to zero;

converting the first bit switched multiplicand from the initial basis into a triangular basis;

switching data bit ordering of a plurality of coefficient bits representing each of a plurality of coefficients in a Galois Field generator polynomial that defines a Galois Field over which multiplication is to be performed, such that a most significant bit of each of the coefficients is placed into a least significant bit position regardless of the number of bits in the plurality of coefficient bits, successively less significant bits are placed into successively more significant bit positions relative to the least significant bit position, and unused bits are set to zero;

performing multiplication based upon at least the first bit switched multiplicand in the triangular basis and a second multiplicand that is converted from the initial basis to the triangular basis to produce a multiplication result;

converting the multiplication result from the triangular basis to the initial basis to produce a multiplier output; and providing the multiplier output.

14. The machine-readable medium of claim 13, wherein the step of performing multiplication includes the sub-steps of:

generating a Hankel Matrix based upon the first multiplicand and the plurality of coefficients; and multiplying the Hankel matrix with a second multiplicand to produce the multiplication result.

15. The machine-readable medium of claim 13, wherein the step of switching data bit ordering of a plurality of data bits includes the step of selecting a plurality of outputs from a plurality of data multiplexers, the plurality of data multiplexers including one data multiplexer for each data bit in the plurality of data bits.

16. A hardware implemented flexible Galois field multiplier for multiplying two elements corresponding to a first multiplicand and a second multiplicand of a finite field, with an initial basis, that is redefinable, the multiplier comprising:

a first switching circuit for switching data bit ordering of a plurality of data bits representing a first multiplicand to produce a first bit switched multiplicand, the first switching circuit placing a most significant bit of the first multiplicand into a least significant bit position regardless of the number of bits in the plurality of data bits representing the first multiplicand, placing successively less significant bits into successively more significant bit positions relative to the least significant bit position, and setting unused bits to zero;

a first basis converter for converting the first bit switched multiplicand from an initial basis into a triangular basis;

a second switching circuit for switching data bit ordering of a plurality of coefficient bits representing each of a plurality of coefficients in a Galois Field generator polynomial that defines a Galois Field over which multiplication is to be performed, the second switching circuit placing a most significant bit of each of the coefficients into a least significant bit position regardless of the number of bits in the plurality of coefficient bits, placing successively less significant bits into successively more significant bit positions relative to the least significant bit position, and setting unused bits to zero;

a multiplier for performing multiplication based upon at least the first bit switched multiplicand in the triangular basis and a second multiplicand that is converted from the initial basis to the triangular basis to produce a multiplication result;

a second basis converter for converting the multiplication result from the triangular basis to the initial basis; and an output for providing the multiplication result in the initial basis.

17. The hardware implemented multiplier of claim 16, wherein the multiplier generates a Hankel Matrix based upon the first multiplicand and the plurality of coefficients, and multiplies the Hankel matrix with a second multiplicand to produce the multiplication result.

18. The hardware implemented multiplier of claim 16, wherein the first switching circuit includes a plurality of data multiplexers, the plurality of data multiplexers including one data multiplexer for each data bit in the plurality of data bits.

* * * * *